(12) United States Patent
El-Moussa

(10) Patent No.: US 10,205,739 B2
(45) Date of Patent: Feb. 12, 2019

(54) SECURITY PROTOCOL MONITORING

(71) Applicant: British Telecommunications Public Limited Company, London (GB)

(72) Inventor: Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 158 days.

(21) Appl. No.: 15/303,354

(22) PCT Filed: Apr. 8, 2015

(86) PCT No.: PCT/GB2015/051075
§ 371 (c)(1),
(2) Date: Oct. 11, 2016

(87) PCT Pub. No.: WO2015/155529
PCT Pub. Date: Oct. 15, 2015

(65) Prior Publication Data
US 2017/0034204 A1    Feb. 2, 2017

(30) Foreign Application Priority Data

Apr. 11, 2014 (EP) ..................... 14164518

(51) Int. Cl.
*H04L 29/06* (2006.01)
*G06F 21/57* (2013.01)
*H04L 12/26* (2006.01)

(52) U.S. Cl.
CPC ........ *H04L 63/1433* (2013.01); *G06F 21/577* (2013.01); *H04L 43/10* (2013.01); *H04L 63/166* (2013.01); *H04L 63/20* (2013.01)

(58) Field of Classification Search
CPC ... H04L 63/1433; H04L 63/166; H04L 63/20; H04L 67/145; H04L 43/10; G06F 21/577; G06F 21/78
See application file for complete search history.

(56) References Cited

U.S. PATENT DOCUMENTS

| | | | | |
|---|---|---|---|---|
| 5,950,113 A * | 9/1999 | Meihofer | ............ | H04W 84/025 340/7.21 |
| 8,606,901 B2 * | 12/2013 | Qiu | ..................... | G06F 11/0709 709/223 |
| 2007/0297609 A1 | 12/2007 | Adams et al. | | |
| 2011/0202292 A1 * | 8/2011 | McCoy | ................. | G01M 3/165 702/51 |

(Continued)

OTHER PUBLICATIONS

International Preliminary Report on Patentability for corresponding International Application No. PCT/GB2015/051075 dated Oct. 12, 2016; 8 pages.

(Continued)

*Primary Examiner* — Ghodrat Jamshidi
(74) *Attorney, Agent, or Firm* — Amy M. Salmela; Patterson Thuente Pedersen, P.A.

(57) ABSTRACT

Preventing unintentional communication of data over a network by monitoring an outbound memory buffer of a computer system, the outbound memory buffer storing outbound network messages, and in response to a detection of an outbound network message corresponding to a heartbeat response message, overwriting at least a portion of a payload of the heartbeat response message.

19 Claims, 4 Drawing Sheets

(56) References Cited

U.S. PATENT DOCUMENTS

| | | | | |
|---|---|---|---|---|
| 2012/0250797 | A1* | 10/2012 | Hasegawa | H04L 7/08 |
| | | | | 375/316 |
| 2013/0055025 | A1* | 2/2013 | Feix | G06F 21/554 |
| | | | | 714/32 |
| 2013/0347062 | A1* | 12/2013 | Matityahu | H04L 43/12 |
| | | | | 726/1 |
| 2014/0020113 | A1* | 1/2014 | Shah | G06F 21/60 |
| | | | | 726/27 |

OTHER PUBLICATIONS

International Search Report for corresponding International Application No. PCT/GB2015/051075 dated Jun. 30, 2015; 5 pages.

Written Opinion for corresponding International Application No. PCT/GB2015/051075 dated Jun. 30, 2015; 7 pages.

Green, Matthew; "A Few Thoughts on Cryptographic Engineering. Some randsom thoughts about crypto. Notes from a course I teach. Pictures of my dachshunds." Apr. 8, 2014), XP055146338,Retrieved from the Internet:URL: https://blog.cryptographyengineering.com/2014/04/08/attack-of-the-week-openssl-heartbleed/ [retrieved on Aug. 6, 2018]; 22 pages.

R. Seggelmann et al.; RFC 6520—"Transport Layer Security (TLS) and Datagram Transport Layer Security (DTLS) Heartbeat Extension"; Internet Engineering Task Force (IETF) Request for Comments: 6520 ISSN: 2070-1721 Muenster Univ. of Appl. Sciences GWhiz Arts & Sciences Feb. 2012; https://tools.ietf.org/html/rfc6520; 10 pages. [retrieved Aug. 7, 2018].

Zhang, et al.; "Detecting Encrypted Botnet Traffic"; Computer Science Department, Colorado State University, Fort Collins, United States; (INFOCOM Wkshps), 2013); 6 pages.

* cited by examiner

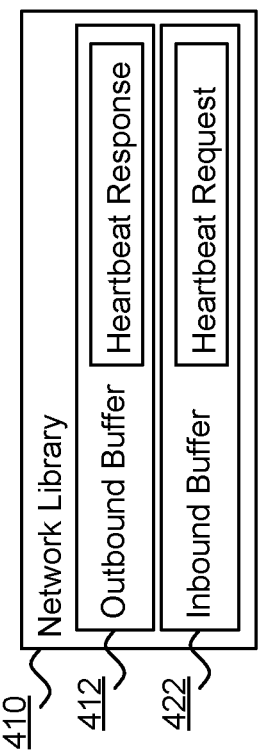
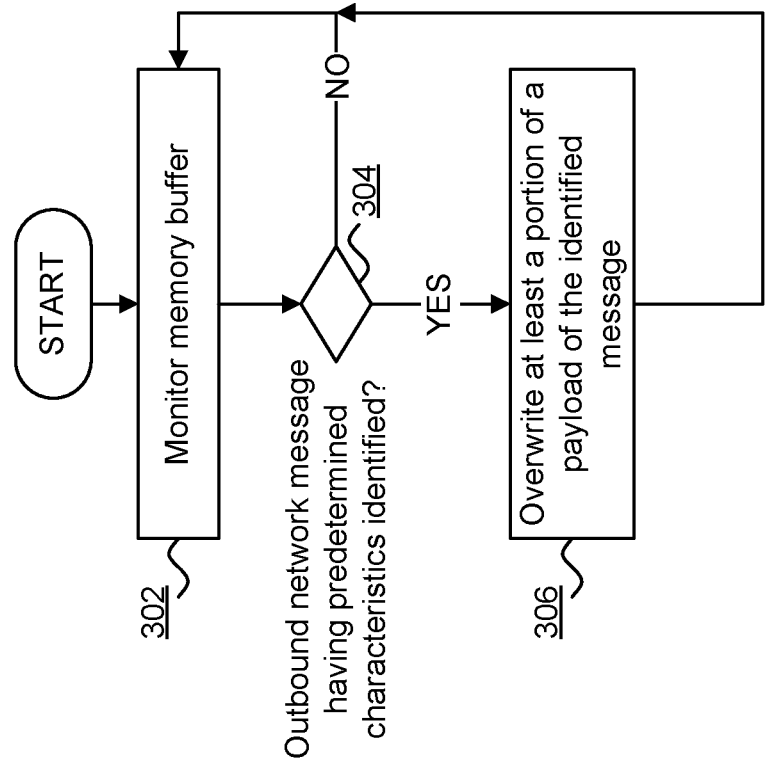

SECURITY PROTOCOL MONITORING

CROSS-REFERENCE TO RELATED APPLICATIONS

The present application is a National Phase entry of PCT Application No. PCT/GB2015/051075, filed on 8 Apr. 2015, which claims priority to EP Patent Application No. 14164518.4, filed on 11 Apr. 2014, which are hereby fully incorporated herein by reference.

TECHNICAL FIELD

The present disclosure relates to monitoring a security protocol. In particular it relates to monitoring for exploitation of vulnerabilities of a security protocol implementation

BACKGROUND

The vulnerability of transport or application layer security protocols, such as protocols operating at the application layer of the internet protocol suite, is widely recognized with the extent of the vulnerability becoming increasingly apparent on detection of the Transport Layer Security (TLS)/Secure Sockets Layer (SSL) "Heartbeat" exploit.

The Heartbeat exploit takes advantage of a vulnerability in an open source implementation of SSL known as OpenSSL, specifically OpenSSL version 1.0.1 and version 1.0.2 beta. The vulnerability arises due to an incorrect implementation of an extension to the SSL protocol known as the "heartbeat extension" defined in RFC6520 (Seggelmann et al., Internet Engineering Task Force (IETF), February 2012). According to the heartbeat extension, "heartbeat" packets can be exchanged between a client and a server communicating via an encrypted connection in order to keep the encrypted connection alive, for example in the absence of substantive packet communication. A client transmits a "heartbeat request" packet to the server with a payload and a payload length field. The server responds with a "heartbeat response" including the payload of the heartbeat request. In this way the server knows to maintain the secure connection (lost secure connections are resource expensive to replace) while the client confirms that the server received the heartbeat request by identity of the payload in the response and request messages. The heartbeat process is defined to include the payload in order that it can be applied to datagram transport protocols such as Datagram Transport Layer Security (DTLS) over User Datagram Protocol (UDP).

Certain versions of OpenSSL incorrectly implement the protocol by permitting a mismatch between a length, in bytes, of a payload in a heartbeat request packet and a stated length in a payload length field of the request packet. Heartbeat request packets with very short (e.g. 1 byte) payloads but with large (e.g. a maximum 64 kilobytes) stated lengths are not detected by the server. In response to such requests the server provides a heartbeat response with a payload of length matching the stated length in the request, irrespective of the actual length of the request payload. Thus, where a server responds with a payload longer than the actual payload received in a heartbeat request message, the server transmits a portion of a memory of the server (a "memory dump") extending beyond the portion containing the payload bytes received in the heartbeat request. This constitutes a type of memory overrun and can include sensitive data such as encryption key, encryption algorithm, encryption version or certificate information employed for the secure communication. In this way, a malicious or tampered client or a malicious interceptor can gain sensitive, secret or secure data from the server. Such data can be used to monitor a secure communication such as by decrypting the communication or masquerading as the client or server, etc.

Fixes and patches for such software defects exhibiting security vulnerabilities can be developed and made available very soon after identification of issues. However, such fixes involve the installation of replacement secure protocol libraries such as SSL libraries. Such installation can require restarting, rebooting, refreshing or relinking communication software or any software involving any communication function. Secure network communication is increasingly endemic to software worldwide, whether consumer web browsers for network services or transactions or large financial institutions such as banks engaged in large numbers of transactions 24 hours a day. Restarting such software can be extremely expensive and the cost of remediating a security vulnerability is substantially measured in terms of lost availability of such services during application of a remediation.

Thus, it would be advantageous to provide for swift and ready remediation of known security protocol vulnerabilities without the aforementioned disadvantages.

SUMMARY

The present disclosure accordingly provides, in a first aspect, a network security assurance method for a computer system executing a software application communicating over a computer network, the method comprising: monitoring a memory buffer of a network communication library installed in the computer system to identify an outbound network message having predetermined characteristics, the characteristics indicating that the message includes a portion of a memory of the computer system that is vulnerable to exposure over the network; in response to the identification, overwriting at least a portion of a payload of the message so as to prevent communicating the vulnerable portion of memory over the network.

Thus, in this way, the method detects outbound network messages in the buffer indicative of exploitation of a vulnerability of a secure protocol library. The method further overwrites payload data of such outbound network messages so as to prevent unintentional communication of data from a memory of the server computer system across the network, such as data arising from a memory overrun and/or defect in the implementation of the secure protocol library, such as OpenSSL version 1.0.1 and version 1.0.2 beta susceptible to the Heartbleed exploit.

In an embodiment, the predetermined characteristics correspond to a heartbeat response message in a network security communication protocol, the heartbeat response message being generated in response to a heartbeat request message in the protocol.

In an embodiment, the predetermined characteristics indicate that the message includes a portion of memory of the computer system immediately following a storage location of a payload of a received heartbeat request message as a vulnerable portion of memory.

In an embodiment, the protocol is taken from the set of: Transport Layer Security Protocol; Secure Sockets Layer Protocol; and Datagram Transport Layer Security Protocol.

The present disclosure accordingly provides, in a second aspect, a method for preventing unintentional communication of data by a software application in a computer system communicating over a computer network, the method comprising: monitoring an outbound memory buffer for the computer system, the outbound memory buffer storing outbound network messages as network messages for communication via the computer network; in response to a detection of an outbound network message in the outbound memory buffer corresponding to a heartbeat response message, overwriting at least a portion of a payload of the heartbeat response message.

The disclosure provides for remediation of a security protocol vulnerability by introducing an additional software component as a security assurance agent at a server computer system and executing in a privileged mode of operation, such as an administrator mode, superuser mode, or other privileged mode of operation. The additional component accesses all application processes executing on the server to identify processes invoking security protocol functions (such as application programming interface (API) functions of the OpenSSL library stored in "ssleay32.dll" in Microsoft Windows, detectable by an "import address table" (IAT) for a process (Microsoft and Windows are trademarks or registered trademarks of Microsoft Corporation in the USA and other countries)). On identification of processes using a potentially vulnerable security library, an interceptor software component accesses all packet information for communication by the server (such as by accessing the packet buffer of the "winsock.dll" of Microsoft Windows). From the packet information it is possible to detect communications consistent with exploitation of the vulnerability (such as heartbeat response packets with larger payloads than corresponding heartbeat request packets) and remediate such vulnerable communication (such as by overwriting the payload of heartbeat response packets). In this way the vulnerability can be detected and remediated at runtime without restarting, relinking or rebooting software in execution. The approach is potentially applicable to any vulnerability arising through the use of a secure communications protocol library, with specifics of detection/remediation being adapted for different vulnerabilities.

In an embodiment, the outbound network message is detected as a heartbeat response message based on a message type field of the outbound network message.

In an embodiment, the method further comprises: monitoring an inbound memory buffer for the computer system, the inbound memory buffer storing inbound network messages received via the computer network; identifying an inbound network message in the inbound memory buffer corresponding to a heartbeat request message for the detected heartbeat response message.

In an embodiment, the inbound network message is unencrypted and the method further comprises: extracting a contents of a field defining a size of a payload of the inbound network message as a size indicator; measuring a size of a payload of the inbound network message; identifying the heartbeat request message as a malicious message based on a comparison of the size indicator and the measured payload size, wherein the overwriting is responsive to the identification of a malicious message.

In an embodiment, the inbound network message is encrypted and the method further comprises: identifying a portion of the heartbeat request message as including at least a payload of the heartbeat request message based on a predefined offset.

In an embodiment, overwriting includes overwriting at least a portion of the payload of the heartbeat response message such that a portion of the payload of the heartbeat response message before the overwriting that is not present in the payload of the heartbeat request message is not included in the heartbeat response message after the overwriting.

In an embodiment, overwriting includes copying the payload of the heartbeat request message as a payload of the heartbeat response message.

In an embodiment, overwriting comprises replacing the payload of the heartbeat response message with random data.

In an embodiment, overwriting comprises replacing the payload of the heartbeat response message with predefined data.

In an embodiment, the method is operable in a privileged mode of operation of the computer system.

The present disclosure accordingly provides, in a third aspect, a security assurance apparatus for preventing unintentional communication of data by a software application in a computer system communicating over a computer network, the apparatus: a monitoring unit adapted to monitor an outbound memory buffer for the computer system, the outbound memory buffer storing outbound network messages as network messages for communication via the computer network; and an interception unit adapted to, in response to a detection by the monitoring unit of an outbound network message in the outbound memory buffer corresponding to a heartbeat response message, overwrite at least a portion of a payload of the heartbeat response message.

In an embodiment, the monitoring unit is further adapted to monitor an inbound memory buffer for the computer system storing inbound network messages received via the computer network, and identify an inbound network message in the inbound memory buffer corresponding to a heartbeat request message for the detected heartbeat response message.

In an embodiment, the inbound network message is encrypted, and wherein the interception unit is further adapted to identify a portion of the heartbeat request message as including at least a payload of the heartbeat request message based on a predefined offset.

In an embodiment, the interception unit is adapted to overwrite by overwriting at least a portion of the payload of the heartbeat response message such that a portion of the payload of the heartbeat response message before the overwriting that is not present in the payload of the heartbeat request message is not included in the heartbeat response message after the overwriting.

In an embodiment, the interception unit is adapted to overwrite by copying the payload of the heartbeat request message as a payload of the heartbeat response message.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flowchart of a method of the security assurance agent of FIG. 2 in accordance with embodiments of the present disclosure.

FIG. 4 is a block diagram of a network library of the computer system of FIG. 2 in accordance with embodiments of the present disclosure.

DETAILED DESCRIPTION OF THE EMBODIMENTS

Figure 1:
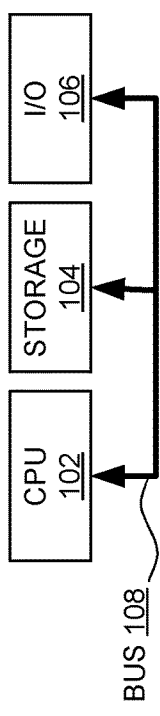
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
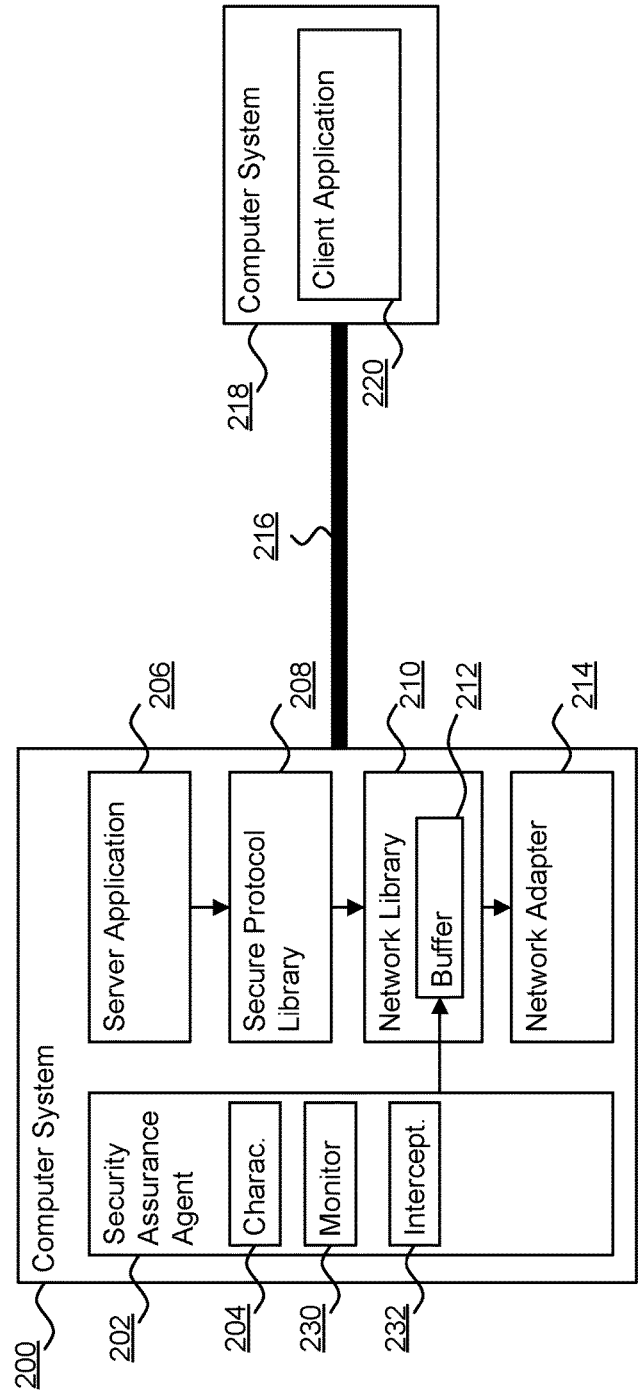
FIG. 2 is a block diagram of a computer system including a security assurance agent in accordance with embodiments of the present disclosure.

FIG. 2 is a block diagram of a computer system 200 including a security assurance agent 202 in accordance with embodiments of the present disclosure. The security assurance agent 202 is a hardware, software or firmware component for assuring security of network communication including preventing unintentional communication of data by a software application 206 in the computer system 200 communicating over a computer network 216. The security assurance agent 202 can be embodied as a software component such as a software application, a software function, an operating system function or utility, a component of a software-based intrusion detection system, a firewall or proxy function and the like. Alternatively or additionally, the security assurance agent 202 can be embodied partly or entirely in hardware as a security assurance apparatus such as a wholly or partly hardware component of a computer system, a pervasive device, a network device such as a switch or router and the like.

The computer system is operable in communication with one or more other computer systems, terminals, devices, network components and the like via the computer network 216 which can be a wired, wireless, fixed-line, cellular, mobile or other network suitable for providing network communications between devices. In an embodiment, the network 216 operates a multi-level architecture such as the Open Systems Interconnection (OSI), Internet Protocol Suite architecture or any other networking architecture. The server application 206 is a software application partly or wholly executing on the computer system 200. The application 206 can be a user-level application executing in a user mode of an operating system or environment of the computer system 200. Alternatively, the application 206 can be a software component of a system, kernel or operating system mode function or component of the computer system 200. For example, the server application 206 is a network server software component such as a file transfer server, a web server, an electronic commerce server, a transaction processing server, a middleware server, a user interface server, a financial transaction processing server, a software entertainment server or any other server software component. The server application 206 communicates with one or more client applications 220 executing on client computer systems 218 such as remote or local computer systems, devices, network components, terminals, consoles, entertainment devices and the like. It will be appreciated by those skilled in the art that the server application 206 and the client application 220 can execute on disparate, separate, separated and/or different computer systems 200, 218. Alternatively, the server application 206 and the client application 220 can execute on a single computer system within which they communicate via a network connection. For example, the server application 206 and the client application 220 can execute as virtual machines in a virtualized computing environment in which they potentially share all or some hardware, software or other facilities.

The server application 206 provides secure communication to the client application 220 using a secure protocol library 208. The secure protocol library 208 is a software library such as a shared library, dynamically linked library, operating system service or function and the like. In one embodiment, the secure protocol library 208 is a library providing secure socket layer functionality for the server application 206 such as an OpenSSL library. For example, the secure protocol library 208 is embodied as "ssleay32.dll" or "libeay32.dll" as are known in the art. The secure protocol library 208 provides interface functions, methods, procedures and/or routines along with any requisite associated data for providing secure network communications facilities to the server application 206. For example, the secure protocol library 208 provides facilities for a secure communications protocol taken from the set of: Transport Layer Security Protocol (TLS); Secure Sockets Layer Protocol (SSL); and Datagram Transport Layer Security Protocol (DTLS).

The server application 206 and the secure protocol library 208 communicate via the network 216 using a network library 210 such as an operating system, kernel or operating environment network library. The network library 210 is a software library such as a shared library, dynamically linked library, operating system service or function and the like. The network library 210 provides network communication functions for sending and receiving network messages over the network 216. In an embodiment, the network library 210 operates at a level of abstraction of a layered network protocol stack, such as the OSI or Internet Protocol Suite architecture. For example, the network library 210 can provide Transmission Control Protocol/Internet Protocol (TCP/IP) network communications facilities for the server application 206 and the secure protocol library 208. In one embodiment, the network library is embodied as a dynamic link library such as "winsock.dll" as is known in the art. The network library 210 includes one or more buffers 212 for the storage of network messages such as messages, packets, frames and the like. The buffer 212 is a memory area reserved by the network library 210. A network message, such as a TCP/IP message, for transmission by the network library 210 on behalf of the secure protocol library 208 and the server application 206, known as an outbound message, is stored in the buffer 212 before transmission. The network library 210 is operable to communicate a network message stored in the buffer 212 over the network 216 via a network adapter 214. The network adapter 214 can be a physical network adapter such as a hardware network adapter or a virtualization of a network adapter such as a software network adapter providing an abstraction or emulation of a real network adapter. The network adapter 214 can be represented to the network library 210 through a network driver, or alternatively the network adapter 214 can be accessed by the network library via other intermediate software and/or hardware components such as operating system or computing components operating at lower levels of a layered network architecture. It will be appreciated that similar, equivalent or alternative components to those provided in the server computer system 200 can also be provided at the client computer system 218 and these have been omitted for clarity.

In use the server application 206 communicates securely with the client application 220 over the network 216 via the secure protocol library 208, the network library 210 and the network adapter 214. In particular, network library 210 provides network communication such as application or transport layer communications facilities. The secure protocol library 208 provides secure protocol facilities such as application or transport layer security. The network adapter and associated facilities can provide internet and link layer facilities which can, but not necessarily, include hardware network facilities such as Ethernet facilities. As hereinbefore described, network messages communicated from the server computer system 200 can include data that is not intended for communication. For example, where the secure protocol library 208 includes certain versions of the OpenSSL implementation of the SSL protocol, messages communicated by the server computer system 200 can include data taken from a memory of the server computer system 200 that is intended to be kept private, secret, or restricted to the server computer system 200. Specifically, a memory overrun can occur where the client application 220 sends a Heartbeat Request message ("heartbeat_request" in RFC6520) in which a purported length of a payload of the request is longer than the actual payload length. The memory overrun occurs in response to the Heartbeat Request by the server computer system 200 since the secure protocol library 208 returns a portion of memory of the server computer system 200 corresponding to the purported payload length in the Heartbeat Request, not the actual payload length. This vulnerability in OpenSSL is known in the art as the "Heartbleed" attack or exploit that takes advantage of the "Heartbeat" vulnerability in certain secure protocol libraries.

Accordingly, an outbound message stored in the buffer 212 of the network library 210 can exhibit characteristics indicating that the message includes a portion of a memory of the server computer system 200 that is vulnerable to exposure over the network. For example, an outbound message stored in the buffer 212 that is a heartbeat response message of the SSL protocol (as defined in RFC6520) can be sufficient to indicate that the message includes a portion of memory so vulnerable. Alternatively, further characteristics can be employed to detect outbound network messages that may deliver the fruits of exploitation of a vulnerability. For example, exploitation can be detected for heartbeat response messages corresponding to heartbeat request messages where the heartbeat request includes a payload having a length that does not match a purported length within the heartbeat request. Such response messages are liable to communicate data from a memory of the server computer system 200 that is not intended for communication—as unintentional communication. A further characteristic indicating exploitation is where a heartbeat response message includes a portion of memory of the server computer system 200 immediately following a storage location of a payload or a received heartbeat request message. That is to say that a received heartbeat request message payload is stored in a memory of the server computer system 200 and a corresponding heartbeat response message is formed to include the stored payload and a further portion of memory of the server computer system 200 immediately following the stored payload. Such heartbeat response messages are also indicative of exploitation.

In one embodiment, the security assurance agent 202 includes a definition of one or more characteristics 204 of outbound network messages indicative of exploitation as messages that include a portion of memory of the server computer system 200 that is vulnerable to exposure over the network 216. Such characteristics 204 can include that the outbound message is a heartbeat response message.

The security assurance agent 202 further includes monitoring unit 230 and interception unit 232 as software, hardware or firmware components. The monitoring unit 230 monitors the memory buffer 212 to identify outbound messages satisfying the characteristics 204. In one embodiment, the security assurance agent 202 is provided without the characteristics 204 and the monitoring unit 230 monitors the memory buffer 212 to detect outbound network messages corresponding to heartbeat response messages. The interception unit 232 overwrites at least a portion of a payload of a message identified in the buffer 212 by the monitoring unit 230. Thus, heartbeat response messages detected in the buffer 212 by the monitoring unit 230 had at least a portion of their payload overwritten by the interception unit 232 so as to prevent unintentional communication of data from a memory of the server computer system 200 over the network 216. To ensure access to the buffer 212 of the network library 210 by the components of the security assurance agent 202, the security assurance agent 202 preferably executes in a privileged mode of operation of the computer system 200 such as a superuser mode, an administrator mode or other privileged mode of operation. In one embodiment, the security assurance agent 202 is provided as part of a virus detection, intrusion detection, firewall or proxy facility authorized to execute in a privileged mode of operation. Alternatively, the security assurance agent 202 can be provided as part of an operating system of the computer system 200.

Thus, in this way, the security assurance agent 202 detects outbound network messages in the buffer 212 indicative of exploitation of a vulnerability of the secure protocol library 208. The security assurance agent 202 further overwrites payload data of such outbound network messages so as to prevent unintentional communication of data from a memory of the server computer system 200 across the network 216, such as data arising from a memory overrun and/or defect in the implementation of the secure protocol library 208, such as OpenSSL version 1.0.1 and version 1.0.2 beta susceptible to the Heartbleed exploit. In this way the vulnerability can be detected and remediated at runtime without restarting, relinking or rebooting the server application 206 or other software in execution in the computer system 200. The approach is potentially applicable to any vulnerability arising through the use of a secure communications protocol library, with specifics of detection/remediation being adapted for different vulnerabilities.

FIG. 3 is a flowchart of a method of the security assurance agent 202 of FIG. 2 in accordance with embodiments of the present disclosure. At 302 the security assurance agent 202 monitors the buffer 212. At 304 the agent 202 determines if an outbound message stored in the buffer 212 has predetermined characteristics, such as characteristics 204 stored by the agent 202. If the predetermined characteristics are present, the method overwrites (306) at least a portion of a payload of the outbound message in the buffer 212 so as to prevent communicating a vulnerable portion of memory over the network 216.

In some embodiments, the server computer system 200 includes multiple server applications 206 each executing together at the same time. For example, a web server, electronic commerce server, file transfer server, media server and transaction server can all execute at the same time. In such embodiments, the security assurance agent 202 can include additional functionalities. One such additional functionality of the agent 202 is to enumerate all processes and/or services executing on the server 200 so as to produce, for example, a list or other data structure of processes/services. Further, the agent 202 can be adapted to detect the use of one or more secure protocol libraries 208 by the processes/services executing in the server 200 to produce a shortlist of processes/services communicating over the network 216 using a secure protocol. For example, such detection can be achieved by the agent 202 inspecting an Import Address Table (IAT) of each process/service in execution to identify the address or identification of a secure protocol library 208 such as the "ssleay32.dll" or "libeay32.dll" libraries. In this way the agent 202 is operable to identify those processes/applications constituting server applications 206 communicating over the network 216 using a secure protocol without a requirement to predefine, predetermine or configure the agent 202 with information relating to which processes/services constitute such server applications 206.

In some embodiments, the monitoring unit 202 monitors the buffer 212 to detect an outbound network message corresponding to a heartbeat response message. A heartbeat response message can be detected based on a message type field in the outbound message. As defined in RFC6520, heartbeat messages include a message type field taken from an enumeration of "heartbeat_request" and "heartbeat_response". The heartbeat type field is not encrypted as part of secure communication for the SSL, TLS or DTLS protocols. Thus, even where a heartbeat message is encrypted the message type will be available for inspection by the monitoring unit 230.

FIG. 4 is a block diagram of a network library 410 of the computer system 200 of FIG. 2 in accordance with embodiments of the present disclosure. The network library of FIG. 4 is an alternative or elaborated network library 410 and includes: an outbound buffer 412 for the storage of outbound messages for communication via the network 216 (such as the "send" buffer for the "winsock" library); and an inbound buffer 422 for the storage of inbound network messages received via the computer network 216 (such as the "receive" or "rcv" buffer for the "winsock" library). The inbound buffer 422 can be used to identify the receipt of heartbeat request messages received from a client application 220. In particular, the inbound buffer 422 can be used to identify heartbeat request messages corresponding to heartbeat response messages identified in the outbound buffer 412. Heartbeat request and response messages can be considered to correspond then they are communicated between common computer systems determined, for example, by network address, port or socket information associated with such messages. Thus, the monitor unit 230 can identify heartbeat request messages and corresponding heartbeat response messages and vice versa. In one embodiment, the monitoring unit 230 stores all heartbeat request messages observed in the inbound buffer 422 in order that a corresponding heartbeat request message can be identified for a heartbeat response message subsequently identified in the outbound buffer 412.

Figure 5:
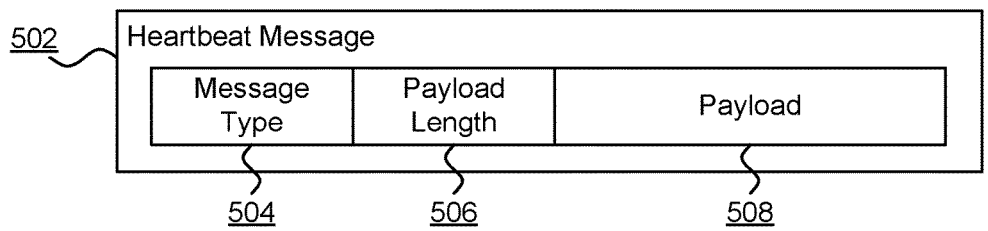
FIG. 5 is a schematic illustration of a heartbeat message of a security protocol for use with the computer system of FIG. 2 in accordance with embodiments of the present disclosure.

FIG. 5 is a schematic illustration of a heartbeat message 502 of a security protocol for use with the computer system 200 of FIG. 2 in accordance with embodiments of the present disclosure. The heartbeat message 502 is consistent with the specification provided by RFC6520 and applies generally to both heartbeat request and response messages. The heartbeat message 502 includes a message type 504, a payload length 506 and payload 508. Heartbeat messages will be encrypted if communicated subsequent to the completion of secure protocol handshake, such as following SSL handshake, though messages communicated before such handshake is complete will not be encrypted. As noted above, the message type is not encrypted in order that the heartbeat message type can be discerned even for encrypted heartbeat messages. RFC6520 further specifies a "padding" field at the end of a heartbeat message though this has been omitted here for clarity.

In use, a heartbeat request message is communicated by a client computer system 218 to a server computer system 200. The payload can be any arbitrary data bytes as short as one byte and up to 64 kilobytes. On receipt by the server 200, and provided the secure protocol connection is maintained by the server 200, the secure protocol library 208 generates a heartbeat response message including a payload identical to the payload of the heartbeat request message. Under exploitation, the heartbeat request message has a payload containing a number of bytes less than a purported or indicated number of bytes in the payload length 506 field. The effect of this on vulnerable secure protocol libraries 208 is that while the shorter payload is stored in a memory of the computer system 200, the heartbeat response message is generated with a payload having as many bytes as were indicated in the payload length 506 field of the heartbeat request message. The additional bytes constitute a memory overrun (i.e. data from a memory of the computer system 200 immediately following a storage location of the payload of the heartbeat request message are included in the heartbeat response message). It is the inclusion of such additional data bytes from the server computer system that constitutes a vulnerable portion of memory of the server computer system 200 and data that is unintentionally communicated via the network 216. Such data is often local to the secure protocol library and can, therefore, include extremely sensitive information including security keys such as a symmetric key used for an SSL connection between a server application 206 and a client application 220. Other sensitive information that can be vulnerable includes certificates, negotiated security parameters such as encryption algorithms, versions and standards, credentials and the like.

In one embodiment, when the monitoring unit 230 identifies a heartbeat request in the inbound buffer 422, the monitoring unit 230 determines if the heartbeat request message is encrypted. Such a determination can be made based on observation of the network message in conjunction with a Shannon entropy calculation for the message (see "Detecting Encrypted Botnet Traffic", Zhang et al, 2013). Alternatively, the monitoring unit 230 can determine a state of the connection from the secure protocol library 208 to indicate whether the secure handshake has concluded and the messages are encrypted. Where the monitoring unit 230 determines that a heartbeat request is not encrypted, the monitoring unit 230 extracts a contents of the payload length 506 field and compares it with a measurement of the size, length or number of bytes of the payload field 508. Where the extracted length and the measured size differ, the monitoring unit 230 identifies the heartbeat request message as malicious. In this way it is possible to identify heartbeat response messages corresponding to malicious heartbeat request messages to inform the interception unit 232 in intercepting and overwriting heartbeat response message payloads to prevent communication of vulnerable data from the server computer system 200. Thus, the overwriting by the interception unit 232 can be responsive to the detection of a malicious message by the monitoring unit 230. Further, on identification of a malicious heartbeat request message, the monitoring unit 230 can identify a payload of the heartbeat request message for use subsequently to overwrite the payload of a heartbeat response message as described in more detail below.

Figure 6:
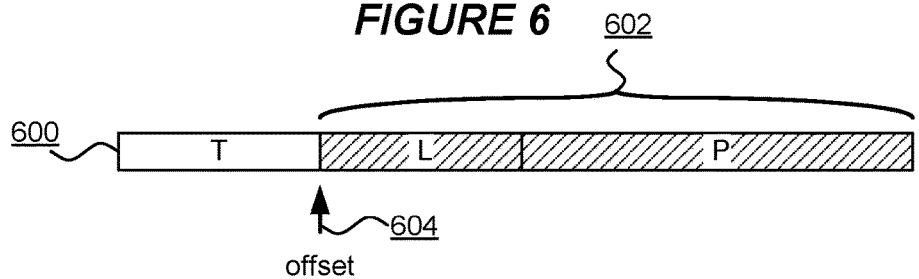
FIG. 6 is a schematic illustration of an exemplary heartbeat message in accordance with embodiments of the present disclosure.

In one embodiment, where the monitoring unit 230 determines that a heartbeat request in the inbound buffer 422 is encrypted, the monitoring unit 230 can identify a portion of the heartbeat request message as including a payload of the heartbeat request message based on a predefined offset 604. FIG. 6 is a schematic illustration of an exemplary heartbeat message 600 in accordance with embodiments of the present disclosure. The heartbeat request message includes a message type portion ("T") and an encrypted portion 602 including a payload length ("L") and a payload ("P"). Since the payload length and payload are encrypted, it is not possible to determine the value of the length field for comparison with a measure of the size of the payload. In one embodiment the monitoring unit 230 has access to a symmetric encryption key and algorithm used by the secure protocol library 208. In such an embodiment the monitoring unit 230 can decrypt the heartbeat request message and treat it is an unencrypted message as described above. Alternatively, where access to the key is not provided or is not desirable, the monitoring unit 230 identifies a portion of the heartbeat request message as including at least a payload of the message based on the predefined offset 604. The offset is defined in view of the specification of a heartbeat request message including the length of the message type field ("T") so as to determine at least that portion of the message occurring subsequent to the message type. Thus, in this way a portion of the heartbeat request message including the payload (such as the entire portion 602) is identified by the monitoring unit 230. The identified payload portion of the heartbeat request message can be used subsequently to overwrite the payload of a heartbeat response message as described in more detail below.

In one embodiment, where the heartbeat request message is encrypted, the monitoring unit 230 can identify a malicious heartbeat request message by comparing the heartbeat request message with a corresponding heartbeat response message. Where the secure protocol library 208 employs symmetric encryption, such as can be the case with SSL and TLS, etc., the encrypted portion of the heartbeat request message should substantially match the encrypted portion of the heartbeat response message. Where there is no match, the heartbeat request message can be identified as a malicious request since this indicates that there is data in the heartbeat response extending beyond the data in the heartbeat request, indicative of exploitation of a vulnerability.

Figure 7:
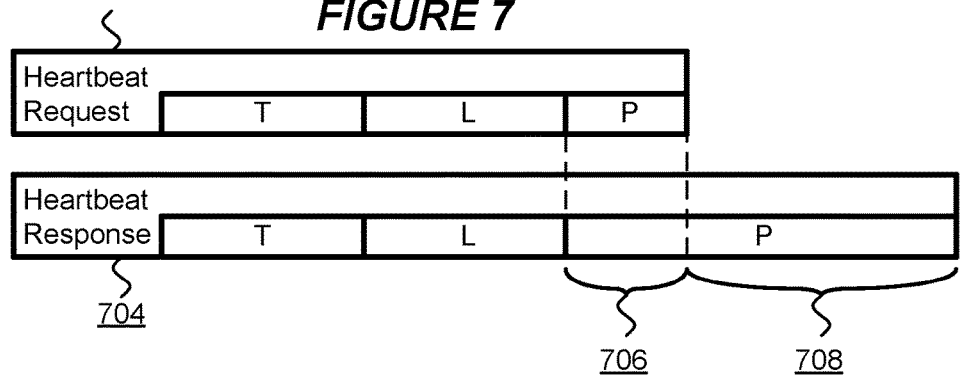
FIG. 7 is a schematic illustration of a heartbeat request message and a heartbeat response message in accordance with embodiments of the present disclosure.

In one embodiment, the overwriting by the intercepting unit 232 includes overwriting a portion of the payload of the heartbeat response message such that the heartbeat response message includes substantially the same payload as the heartbeat request message. FIG. 7 is a schematic illustration of a heartbeat request message 702 and a heartbeat response message 704 in accordance with embodiments of the present disclosure. In FIG. 7, the heartbeat request message 702 includes a payload "P" that is relatively short compared to a payload of a corresponding heartbeat response message 704. Thus, the heartbeat request message 702 is a malicious request causing the vulnerable secure protocol library 208 to respond with a payload including both the request payload 706 and vulnerable data 708 from a memory of the server computer system 200. The vulnerable data 708 constitutes a portion of the heartbeat response message that is not present in the payload of the heartbeat request message. The interception unit 232 overwrites at least the portion 708 of the payload of the heartbeat response message such that it is not present in the heartbeat response when the response is communicated over the network 216. In this way the vulnerable data in the portion 708 is protected by overwriting.

The overwriting by the interception unit 232 can be achieved by copying a payload from a heartbeat request message to a corresponding heartbeat response message. Where the request payload is of insufficient length to overwrite all of the heartbeat response message (which will typically be the case where a vulnerability is exploited), then the remainder of the heartbeat response payload can be overwritten with fixed, predetermined, random or scrambled data. Alternatively, in some embodiments, the entirety of the payload of the heartbeat response message is overwritten by replacement with random data or predefined data, such as repetitions of a single byte to completely overwrite the payload.

Figure 8:
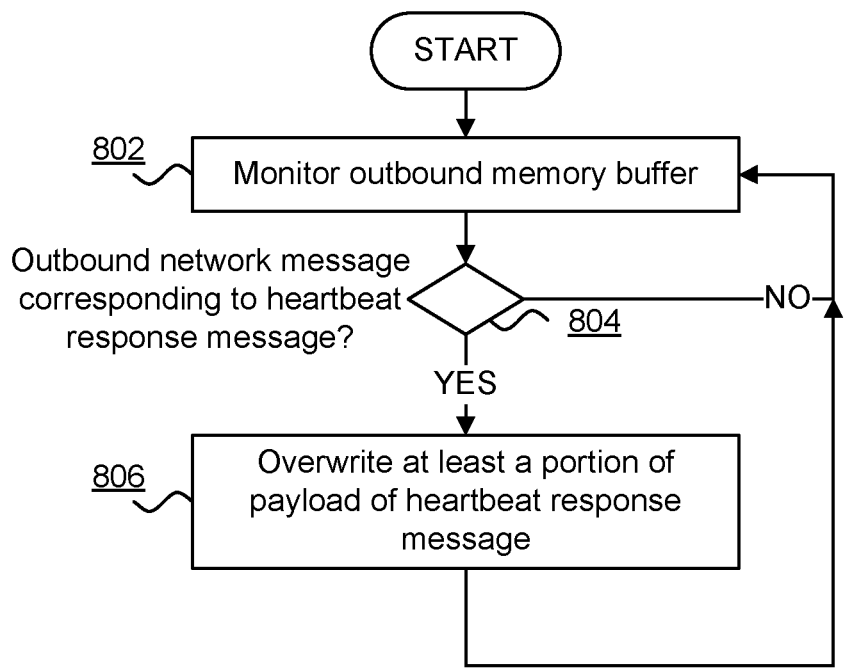
FIG. 8 is a flowchart of a method of the security assurance agent of FIG. 2 in accordance with embodiments of the present disclosure.

FIG. 8 is a flowchart of a method of the security assurance agent 200 of FIG. 2 in accordance with embodiments of the present disclosure. At 802 the security assurance agent 202 monitors the outbound buffer 412. At 804 the agent 202 determines if an outbound message stored in the outbound buffer 412 corresponds to a heartbeat response message. In one embodiment this determination is made by reference to a message type field of the outbound message. If the outbound message corresponds to a heartbeat response message, the method overwrites (806) at least a portion of a payload of the heartbeat response message in the outbound buffer 412 so as to prevent communicating a vulnerable portion of memory over the network 216.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been set out in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A network security assurance method for a computer system executing a software application communicating over a computer network, the method comprising:
    monitoring a memory buffer of a network communication library installed in the computer system to identify an outbound network message having predetermined characteristics, the characteristics indicating that the message includes a portion of a memory of the computer system that is vulnerable to exposure over the network; and
    in response to the identification, overwriting at least a portion of a payload of the message so as to prevent communicating the vulnerable portion of memory over the network,
    wherein the predetermined characteristics correspond to a heartbeat response message in a network security communication protocol, the heartbeat response message being generated in response to a heartbeat request message in the protocol.

2. The method of claim 1 wherein the predetermined characteristics indicate that the message includes a portion of memory of the computer system immediately following a storage location of a payload of a received heartbeat request message as a vulnerable portion of memory.

3. The method of claim 1 wherein the protocol is taken from the set of: Transport Layer Security Protocol; Secure Sockets Layer Protocol; and Datagram Transport Layer Security Protocol.

4. The method of claim 1 wherein the method is operable in a privileged mode of operation of the computer system.

5. A method for preventing unintentional communication of data by a software application in a computer system communicating over a computer network, the method comprising:
    monitoring an outbound memory buffer for the computer system, the outbound memory buffer storing outbound network messages as network messages for communication via the computer network; and
    in response to a detection of an outbound network message in the outbound memory buffer corresponding to a heartbeat response message, overwriting at least a portion of a payload of the heartbeat response message.

6. The method of claim 5 wherein the outbound network message is detected as a heartbeat response message based on a message type field of the outbound network message.

7. The method of claim 5 further comprising:
    monitoring an inbound memory buffer for the computer system, the inbound memory buffer storing inbound network messages received via the computer network; and
    identifying an inbound network message in the inbound memory buffer corresponding to a heartbeat request message for the detected heartbeat response message.

8. The method of claim 7 wherein the inbound network message is unencrypted, the method further comprising:
    extracting a contents of a field defining a size of a payload of the inbound network message as a size indicator;
    measuring a size of a payload of the inbound network message; and
    identifying the heartbeat request message as a malicious message based on a comparison of the size indicator and the measured payload size,
    wherein the overwriting is responsive to the identification of a malicious message.

9. The method of claim 7 wherein the inbound network message is encrypted, the method further comprising:
    identifying a portion of the heartbeat request message as including at least a payload of the heartbeat request message based on a predefined offset.

10. The method of claim 8 wherein overwriting includes overwriting at least a portion of the payload of the heartbeat response message such that a portion of the payload of the heartbeat response message before the overwriting that is not present in the payload of the heartbeat request message is not included in the heartbeat response message after the overwriting.

11. The method of claim 8 wherein overwriting includes copying the payload of the heartbeat request message as a payload of the heartbeat response message.

12. The method of claim 8 wherein overwriting comprises replacing the payload of the heartbeat response message with random data.

13. The method of claim 8 wherein overwriting comprises replacing the payload of the heartbeat response message with predefined data.

14. A security assurance apparatus for preventing unintentional communication of data by a software application in a computer system communicating over a computer network, the apparatus comprising:
    a processor and a memory comprising software, to:
        monitor an outbound memory buffer for the computer system, the outbound memory buffer storing outbound network messages as network messages for communication via the computer network; and
        in response to a detection of an outbound network message in the outbound memory buffer corresponding to a heartbeat response message, overwrite at least a portion of a payload of the heartbeat response message.

15. The apparatus of claim 14, further adapted to monitor an inbound memory buffer for the computer system storing inbound network messages received via the computer network, and identify an inbound network message in the inbound memory buffer corresponding to a heartbeat request message for the detected heartbeat response message.

16. The apparatus of claim 15 wherein the inbound network message is encrypted, and wherein the apparatus is further adapted to identify a portion of the heartbeat request message as including at least a payload of the heartbeat request message based on a predefined offset.

17. The apparatus of claim 16, further adapted to overwrite by overwriting at least a portion of the payload of the heartbeat response message such that a portion of the payload of the heartbeat response message before the overwriting that is not present in the payload of the heartbeat request message is not included in the heartbeat response message after the overwriting.

18. The apparatus of claim 16, further adapted to overwrite by copying the payload of the heartbeat request message as a payload of the heartbeat response message.

19. A non-transitory computer readable storage element storing computer program code to, when loaded into a computer system and executed thereon, cause the computer to:
- monitor a memory buffer of a network communication library installed in a computer system executing a software application communicating over a computer network to identify an outbound network message having predetermined characteristics, the characteristics indicating that the message includes a portion of a memory of the computer system that is vulnerable to exposure over the network; and
- in response to the identification, overwrite at least a portion of a payload of the message so as to prevent communicating the vulnerable portion of memory over the network,
- wherein the predetermined characteristics correspond to a heartbeat response message in a network security communication protocol, the heartbeat response message being generated in response to a heartbeat request message in the protocol.

* * * * *